United States Patent Office 3,394,136
Patented July 23, 1968

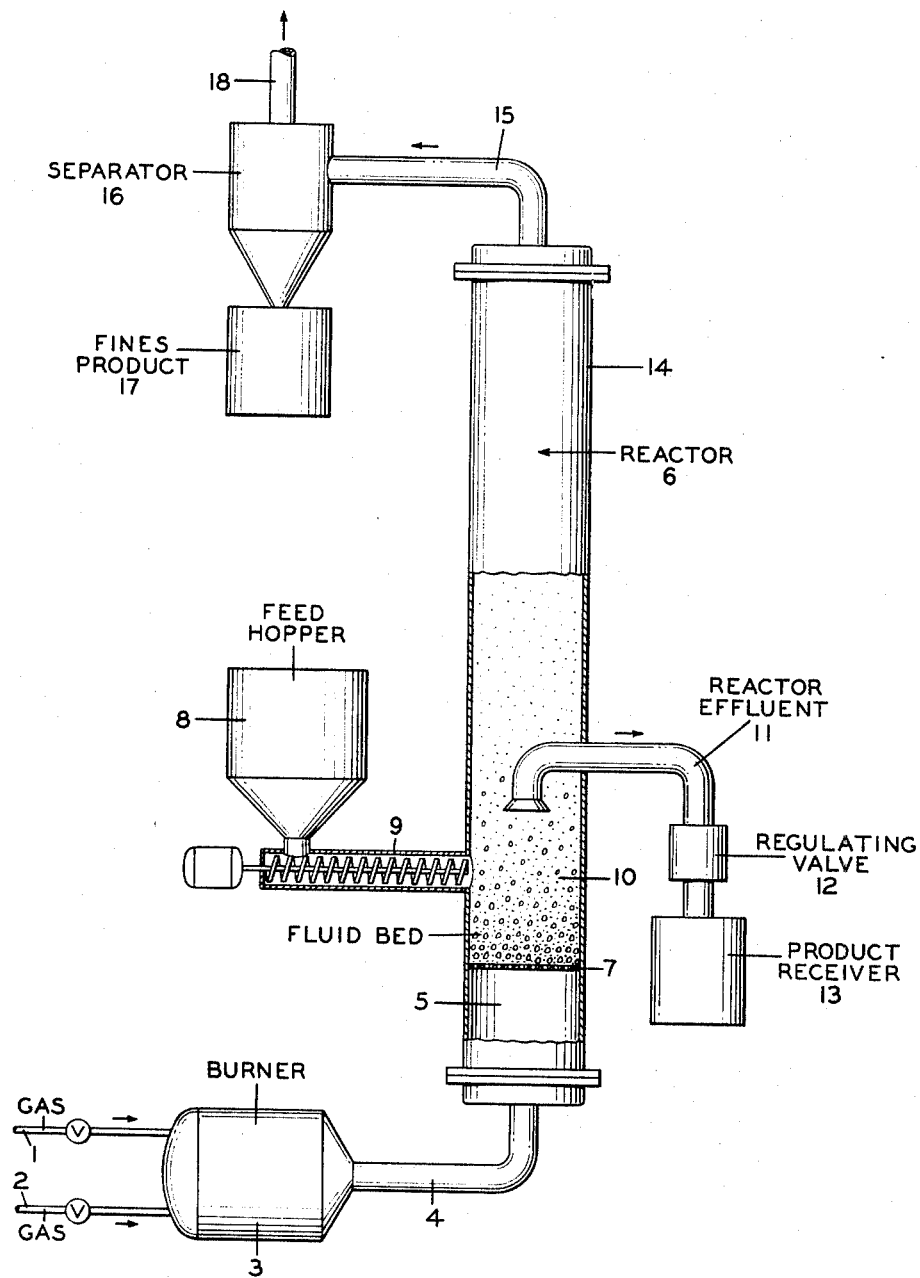

3,394,136
PRODUCTION OF CYANURIC ACID
William P. Moore and Dale E. Elliott, Chester, Pa., assignors to Allied Chemical Corporation, New York, N.Y., a corporation of New York
Filed Mar. 17, 1966, Ser. No. 535,214
8 Claims. (Cl. 260—248)

This invention relates to an improved process for producing cyanuric acid.

It is known to produce cyanuric acid by heating urea, preferably containing a compound such as ammonium chloride or zinc chloride, to temperatures above 180° C. at superatmospheric pressures. This process has been found to be accompanied by severe operational difficulties due to the build-up of solids on the inner wall of the synthesis vessel, which reduces heat transfer efficiency and requires frequent interruption of the operation to permit its removal.

It is also known to convert urea to cyanuric acid in organic heat transfer media, such as hydrocarbon oils. In this method solids build-up on the inner walls of the synthesis vessel is still significant and product obtained by this method is often discolored. In addition, loss of the heat transfer media, particularly when glycols and glycol ethers are used, greatly increases the expense of this type of operation.

In another known process urea, preferably in admixture with particles of cyanuric acid, is heated in a rotary kiln to produce free-flowing granules of crude cyanuric acid. However, the rate of tumbling, the rate of heating and the reactor retention time must be held in close control to prevent the viscous, plastic material from caking on the walls of the reactor and to prevent the formation of very large lumps. Furthermore, losses of as much as 40% are caused by the tendency of urea or ammonium cyanate to vaporize and be carried along by hot gases, mainly ammonia, emitted from the reaction mass.

Another disadvantage of the "rotary kiln" type process is that the kiln is normally externally heated and the heat transfer rate from the heat source to the reactants is relatively low.

Another proposed process comprises first reacting the urea with cyanuric acid to form urea cyanurate which can be subsequently converted to cyanuric acid by heating to temperatures of 180° C. or higher. At low temperatures, e.g. 210° C. urea cyanurate converts to white powdered cyanuric acid in good yield. However, such low temperatures require a long retention time, e.g. 150 minutes, which is not commercially attractive. When higher temperatures, e.g. 260° C., are used the reaction mass agglomerates.

It is therefore, an object of this invention to provide an efficient and economical method for producing cyanuric acid.

It is a more specific object of this invention to produce cyanuric acid in high yields without agglomeration.

These and other objects and advantages which will be made obvious hereinafter are achieved by a process which comprises maintaining a heat reservoir comprising a fluidized body of at least 85% by weight of particles of cyanuric acid, maintaining said fluidized body at a temperature of at least about 230° C. by hot gases passing in contact with said particles at a velocity sufficient to maintain said particles in a fluidized state, introducing solid particulate urea cyanurate into said body, withdrawing solid particulate cyanuric acid from said body, and maintaining the rates of introduction and withdrawal sufficient to maintain the cyanuric acid content of said body at at least about 85% by weight.

It has surprisingly been discovered that when a reaction temperature of at least 230° C. is used, and the cyanuric acid content of the fluidized bed is maintained at at least 85% by weight, solid urea cyanurate can be efficiently and economically converted to cyanuric acid without losing its solid, particulate identity.

Although, for convenience, the reactor feed material will be referred to as urea cyanurate, it is to be understood that said material may contain some minor amounts of biuret, either free or as biuret cyanurate, and some ammelide, as well as a small amount of unreacted urea and cyanuric acid.

The size of the urea cyanurate particles is important and should be in the range 4 to 300 U.S. mesh. Larger particles cause poor heat transfer and fluidization characteristics, while finer material causes excess dust and vaporization losses and necessitates filtration of the exit gases to recover substantial amounts of product which would otherwise be lost. Preferably the particles are finer than 4 U.S. mesh and larger than 150 U.S. mesh.

The urea cyanurate can be prepared by various known processes wherein urea is reacted with cyanuric acid. However, urea cyanurate prepared by the process described in U.S. patent application Ser. No. 383,351, filed July 17, 1965, now U.S. Patent 3,318,887 granted May 9, 1967 wherein pebbled urea is coated with finely divided cyanuric acid and heated to produce hollow pellets of urea cyanurate is preferred. Such pellets are ideally suited for fluidization and do not contain a large excess of cyanuric acid. However, the pellets can be subjected to crushing before use, provided that the resulting particle size is within the specified range.

Any gas which does not react rapidly with the feed material or product can be used to fluidize and heat the reactants. For example, externally heated air can be used. However, it is preferred that combustion gases resulting from burning petroleum gases in air to be used. It is a particular advantage of the present invention that the urea cyanurate can be efficiently and economically directly heated by combustion gases. This method is not normally used in the kiln processes for converting urea to cyanuric acid because the urea is partly hydrolyzed by water vapor in the gas.

The reactants should be heated to at least about 230° C. in order to obtain the full advantages of the present invention. Reaction temperatures in the range 275° C. to 320° C. are preferred, since at these temperatures the most satisfactory reaction rate is achieved. As the reaction temperature increases above about 320° C. there is a tendency for the cyanuric acid to decompose and for by-products such as ammelide to form. The reaction temperature can be controlled by regulating the temperature and velocity of the fluidizing gas and by regulating the average retention time of the particles in the fluidized bed.

The velocity of the fluidizing gas in normally about 1 to 3 feet persecond, but this can be varied depending upon the size of the reactor and the mass of the solid material comprising the fluidized bed. The temperature of the gas is generally substantially higher than that to which the particles are being heated.

The average retention time of the solid materials in the reactor is regulated by controlling the feed rate and the product withdrawal rate. The retention time may be a few minutes, but preferably it is about 15 to 60 minutes. The reaction temperature and the average retention time should be correlated so that the product exiting the reactor comprises at least 85% cyanuric acid, by weight, and preferably 95% or higher.

Reaction pressure is best maintained at near atmospheric. Operation at superatmospheric tends to cause increased amounts of by-products such as ammelide.

The reactor used is preferably one which provides a minimum of exposed surface per unit of volume to prevent high heat losses and poor fluidization characteristics. Reactors of the type used in the catalytic cracking of gasoline or spray units such as those normally used in spray drying liquids or slurries perform well for the instant process.

With reference to the attached drawings of a suitable apparatus, the following is a description of a method of carrying out the process of the present invention.

Natural gas from line 1 and air from line 2 are sent to a gas burner 3 where combustion occurs. The hot combustion gases at a temperature of about 400° to about 600° C. pass through line 4 to the bottom section 5 of the fluidized reactor 6. The gases pass through a distribution plate 7 and upwardly with a gas velocity of about 1.5 to 2.5 feet per second. Crude hollow pebbles of urea cyanurate containing small amounts of biuret, urea and ammelide and about 4 to about 150 U.S. mesh in size are sent from feed hopper 8 via feed screw 9 to the fluid zone 10 of the reactor where they become part of the fluid bed. The particles comprising the fluid bed are maintained in suspension and at about 275° to 320° C. by the hot combustion gases, and the urea cyanurate is converted endothermically to cyanuric acid. Feed to the fluid zone and product-withdrawal through line 11 are continuous at rates sufficient to maintain the composition of the fluidized bed at at least 85% cyanuric acid. Product-withdrawal rate is regulated by valve 12. Product drops to product receiver 13. A small amount of fine cyanuric acid is carried by the combustion gases through the disengaging zone 14 of the fluid reactor. It passes through line 15 to the cyclone type fines separator 16 which drops the fine product into receiver 17 and allows combustion gases and desorbed process gases to go out vent 18.

*Example*

This specific example demonstrates a preferred procedure for producing cyanuric acid in a system as described above using crude urea cyanurate feed in the form of hollow pebbles.

The fluid reactor was 12 inches ID and 6 feet high overall. The gas distributor plate was located 1 foot from the bottom of the reactor. The solid feed entrance point was located 1 foot above the gas distribution plate. Hot gas velocity through the reactor was 115 feet/minute and the fluid bed was expanded from 6 inches, with no gas flow, to a height of 12 inches with gas flow. The reactor feed hopper was charged with hollow pebbles of crude cyanurate (sized to pass through 4 mesh and be retained on 14 mesh screen) with the following chemical composition:

| Component: | Weight percent |
|---|---|
| Urea cyanurate | 92.3 |
| Biuret | 3.0 |
| Urea | 3.7 |
| Cyanuric acid | 1.0 |
| Total | 100.0 |

Valves were opened and adjusted to allow natural gas and air to go to the gas burner. The gas was ignited electrically and the combustion gases were sent to the bottom of the fluid reactor. Air/gas ratio to the burner was adjusted to that temperature of the gases just below the fluid bed was 482° C. Feed of the hollow pebbles from the hopper by screw conveyor to the fluid bed was started and was maintained continuously at a rate of 30 lb. per hour. The feed pebbles were fluidized as soon as they entered the reaction zone. Pyrolysis and release of ammonia gas was continuous and solid product was continuously withdrawn to a cooled product receiver. Temperature three inches up into the reaction zone was 304° C. and three inches down from top of bed was 296° C. Average retention time in the reaction zone was 0.58 hour. Reactor pressure was 4 inches of water. After the system reached steady state conditions data were recorded in a test period of 70 minutes. A small amount of fine product, 0.24 lb., was recovered from the vent gases in the fines separator. The fines were added to the main product recovered to give 31.28 lb. product with the following composition:

| Component: | Weight percent |
|---|---|
| Cyanuric acid | 99.0 |
| Ammelide | 0.7 |
| Other (by difference) | 0.3 |
| Total | 100.00 |

No operating problems occurred and no sticking in the reactor occurred during the test. No viscous plastic condition in the reactants was noted. Yield of cyanuric acid was 93.3% of theory.

We claim:
1. A process for producing cyanuric acid which comprises maintaining a heat reservoir comprising a fluidized body of at least 85% by weight particles of cyanuric acid, maintaining said fluidized body at a temperature of at least about 230° C. by hot gases passing in contact with said particles at a velocity sufficient to maintain said particles in a fluidized state, introducing solid particulate urea cyanurate into said body, withdrawing cyanuric acid from said body and maintaining the rates of said introduction and withdrawal sufficient to maintain the cyanuric acid content of said body at at least about 85% by weight.
2. The process of claim 1 wherein the particles are maintained at a temperature in the range 275° to 320° C.
3. The process of claim 1 wherein the cyanuric acid content of the fluidized body is at least 95% by weight.
4. The process of claim 1 wherein the velocity of the hot gases is in the range about 1 to 3 ft./sec.
5. The process of claim 1 wherein the urea cyanurate particles are sized in the range of 4 to 300 U.S. mesh.
6. The process of claim 1 wherein the hot gases are combustion gases.
7. The process of claim 1 wherein the average residence time of the particles in the agitated body is 15 to 60 minutes.
8. The process of claim 1 wherein the particulate urea cyanurate is in the form of hollow pellets.

References Cited
UNITED STATES PATENTS

| 3,154,545 | 10/1964 | Symes et al. | 260—248 |
| 3,318,887 | 5/1967 | Moore et al. | 260—248 |
| 3,354,158 | 11/1967 | Sobocinski et al. | 260—248 |

JOHN D. RANDOLPH, *Primary Examiner.*

J. M. FORD, *Assistant Examiner.*